United States Patent
Furuya et al.

(10) Patent No.: US 7,542,491 B2
(45) Date of Patent: Jun. 2, 2009

(54) WAVELENGTH CONVERTER AND TWO-DIMENSIONAL IMAGE DISPLAY DEVICE

(75) Inventors: Hiroyuki Furuya, Nara (JP); Kiminori Mizuuchi, Osaka (JP); Kazuhisa Yamamoto, Osaka (JP); Shinichi Shikii, Nara (JP)

(73) Assignee: Panasonic Corporation, Osaka (JP)

( * ) Notice: Subject to any disclaimer, the term of this patent is extended or adjusted under 35 U.S.C. 154(b) by 8 days.

(21) Appl. No.: 11/970,619

(22) Filed: Jan. 8, 2008

(65) Prior Publication Data

US 2008/0165812 A1    Jul. 10, 2008

(30) Foreign Application Priority Data

Jan. 9, 2007    (JP)  ............... 2007-001043

(51) Int. Cl.
*H01S 3/10*    (2006.01)
(52) U.S. Cl. ............... 372/22; 372/6; 372/21; 372/108; 359/326; 359/328
(58) Field of Classification Search ............ 372/6, 372/21, 22, 108; 359/326, 328
See application file for complete search history.

(56) References Cited

U.S. PATENT DOCUMENTS

| 6,014,249 A * | 1/2000 | Fermann et al. .......... 359/341.1 |
| 6,690,709 B2 * | 2/2004 | Hagberg et al. ............. 372/108 |

FOREIGN PATENT DOCUMENTS

| JP | 61-16046 | 3/1984 |
| JP | 2003-318480 | 11/2003 |
| JP | 2004-165396 | 6/2004 |
| JP | 2005-70608 | 3/2005 |
| JP | 2005-159142 | 6/2005 |

\* cited by examiner

*Primary Examiner*—Minsun Harvey
*Assistant Examiner*—Tod T Van Roy
(74) *Attorney, Agent, or Firm*—Wenderoth, Lind & Ponack, L.L.P.

(57) ABSTRACT

The present invention aims to provide a wavelength converter capable of stably obtaining a W-class high-output green laser beam and a 2D image display device using this wavelength converter.

By causing a polarization direction of a laser light source for generating an excitation light and that of a light emitted from an oscillator to orthogonally intersect, the deterioration of an excitation light source by an ASE is suppressed by a polarization splitting element provided between a laser resonator and the laser light source.

11 Claims, 13 Drawing Sheets

WAVELENGTH CONVERTER AND TWO-DIMENSIONAL IMAGE DISPLAY DEVICE

BACKGROUND OF THE INVENTION

1. Field of the Invention

The present invention relates to a wavelength converter capable of obtaining a stable high output visible light laser beam by combining a fiber laser and a wavelength conversion element, and a two-dimensional (2D) image display device using this wavelength converter as a light source.

2. Description of the Background Art

A visible light source capable of emitting a highly monochromatic W-class high output is being required to realize large-size displays, high-luminance displays, etc. High-output red semiconductor lasers used in DVD recorders and the like can be utilized as small-size light sources having high productivity for red light out of three primary colors of red, green and blue. For green and blue light sources, however, realization by semiconductor lasers and the like is difficult and small-size light sources having high productivity are still asked for. Above all, it is highly difficult to realize green light sources since there is no material suitably usable for semiconductor lasers to obtain green output beams.

Wavelength converters as combinations of fiber lasers and wavelength conversion elements are realized as low-output visible light sources for green and blue lights. Small-size green and blue light sources using a semiconductor laser as a light source for excitation light for exciting the fiber laser and using a nonlinear optical crystal as the wavelength conversion element are well-known.

However, several problems need to be solved in order to obtain W-class high-output green and blue beams from such wavelength conversion elements. For example, in the case of obtaining a green output beam using the construction of a conventional wavelength converter, the wavelength converter needs to include a fiber laser for outputting a fundamental wave, a wavelength conversion element for converting the fundamental wave into a green laser beam and a lens for condensing an output of the fundamental wave to an end surface of the wavelength conversion element.

Here, a basic laser operation of this fiber laser is described. First, an excitation light from an excitation laser light source is incident on one end of a fiber. The incident excitation light is absorbed by a laser-active material contained in the fiber, whereby a seed light of the fundamental wave is generated in the fiber. This seed light of the fundamental wave reciprocates by being reflected many times in a resonator using a fiber grating formed in the fiber and a fiber grating of another fiber as a pair of reflection mirrors. Simultaneously, the seed light is amplified by a gain by the laser-active material contained in the fiber to increase its light intensity and to have a wavelength selected, thereby reaching a laser oscillation. It should be noted that the two fibers are connected by a connecting portion and the laser light source is current-driven by a laser current source for excitation.

Next, a basic operation of the wavelength converter is described. The fundamental wave is outputted by the fiber laser as described above to be incident on the wavelength conversion element via the lens. This fundamental wave from the fiber laser is converted into a harmonic by the nonlinear optical effect of the wavelength conversion element. The converted harmonic is partly reflected by a beam splitter, but the other part having passed through the beam splitter becomes a green laser beam as an output beam of the wavelength converter.

The harmonic partly reflected by the beam splitter is converted into an electrical signal to be used for the monitoring of the output beam from the wavelength converter after being received by a light receiving element. An output controller regulates a drive current of the laser light source by means of a laser current source for excitation so that the intensity of the converted signal becomes an intensity to give a desired output in the wavelength converter. Then, the intensity of the excitation light from the laser light source is regulated and the output intensity of the fundamental wave from the fiber laser is regulated, with the result that the output intensity of the wavelength converter is regulated. In this way, a so-called automatic power control (hereinafter, abbreviated as "APC"), in which the output intensity of the wavelength converter is kept constant, is stably performed.

Green high-output laser beams of several hundreds mW can be obtained by the above construction, but it is difficult to obtain W-class green high-output laser beams. Specifically, the outputs of the fundamental wave and excitation light of the fiber laser need to be increased in order to increase the light output of the wavelength converter. On the other hand, it is known that a natural emission called an ASE (Amplified Spontaneous Emission) occurs in a fiber laser light source doped with Yb as a laser-active material and is irradiated to an excitation laser light source (so-called return light) to cause the deterioration of the excitation laser light source. There is another problem that this ASE is generated by unintended light reflection outside a laser resonator to destroy a nonlinear optical crystal for generating a second harmonic. In order to prevent the former problem of the deterioration of the excitation laser, there have been conventionally proposed a method using a dichroic mirror (Japanese Unexamined Patent Publication No. 2004-165396), a method for connecting fibers at an angle (Japanese Unexamined Patent Publication No. 2005-70608), a devised construction of a fiber (Japanese Unexamined Patent Publication No. 2005-159142), the use of a reflection amount regulator for regulating the light quantity of a return light (Japanese Unexamined Patent Publication No. 2003-318480) and the like.

However, there is a high possibility that the wavelength of the ASE generated becomes 1040 nm to 1080 nm close to that (e.g. 915 nm, 975 nm) of an excitation laser in the case of trying to obtain the wavelength (1030 nm to 1100 nm) of a fundamental wave for a laser display. In such a case, excitation efficiency decreases and it is difficult to effectively prevent the ASE from returning to the excitation laser light source through the wavelength selection by a dielectric filter or the like. In the method for connecting the fibers oblique to each other, there has been a problem of deteriorating the connecting portion by the generated ASE.

The wavelength of the ASE generated in the case of trying to obtain the wavelength (1100 nm to 1180 nm) of a fundamental wave for a laser light source for medical use is relatively distant from that of an excitation laser. Thus, the return of the ASE can be hindered through the wavelength selection by a dielectric filter or the like in such a case, but it is expected to more easily build a construction for hindering the return of the ASE.

SUMMARY OF THE INVENTION

In order to solve the problems residing in the prior art, an object of the present invention is to provide a wavelength converter capable of stably obtaining W-class green and blue laser output beams and a high-luminance 2D image display device using this wavelength converter.

In order to accomplish the above object, the present invention is directed to a wavelength converter, comprising a laser resonator including a fiber containing an laser-active material and a fiber grating formed in the fiber; a laser light source for emitting an excitation light to the fiber; a polarization splitting element provided between the laser resonator and the laser light source; and a wavelength conversion element for converting a fundamental wave of a laser beam emitted from the laser resonator into a harmonic, wherein the laser resonator is constructed to emit a beam polarized in a direction normal to a polarization direction of the laser light source using a polarization maintaining fiber and a single polarization mechanism and includes a pair of reflection surfaces; and the polarization splitting element is provided between one of the respective reflection surfaces closer to the laser light source and the laser light source to introduce an excitation light in a specified polarization direction emitted from the laser light source to the laser resonator while introducing the fundamental wave emitted from the laser resonator and having a polarization direction normal to the specified polarization direction in a direction deviated from the laser light source.

According to the wavelength converter of the present invention, W-class green and blue laser beams having high outputs can be stably obtained.

These and other objects, features, aspects and advantages of the present invention will become more apparent upon a reading of the following detailed description with reference to accompanying drawings.

DETAILED DESCRIPTION OF THE PREFERRED EMBODIMENTS OF THE INVENTION

Figure 1:
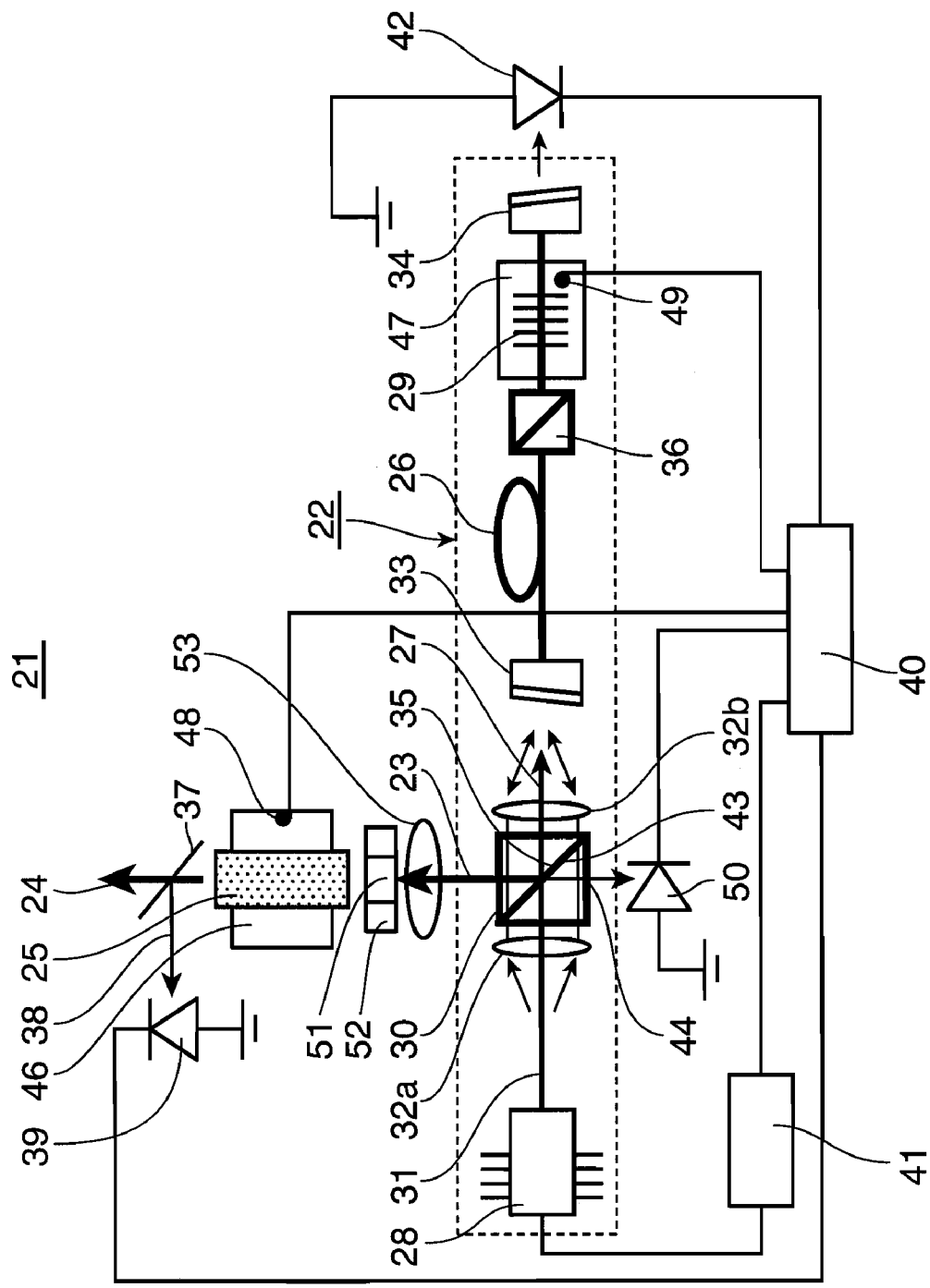
FIG. 1 is a schematic construction diagram of a wavelength converter according to a first embodiment of the invention.

Hereinafter, wavelength converters and 2D image display devices according to embodiments of the present invention are described with reference to the accompanying drawings. It should be noted that the embodiments below are merely specific examples of the present invention and are not of the nature to limit the technical scope of the present invention. Element identified by the same reference numerals may not be repeatedly described in some cases.

First Embodiment

FIGS. 1 to 11 show a first embodiment of a wavelength converter 21 according to the invention. As shown in FIG. 1, the wavelength converter 21 of this embodiment is provided with a fiber laser 22 and a wavelength conversion element 25 for converting a fundamental wave 23 emitted from the fiber laser 22 into a harmonic output 24.

The fiber laser 22 includes a laser light source 28 for outputting an excitation light 27 to be incident on a fiber 26, the fiber 26 internally formed with a fiber grating 29 for reflecting the fundamental wave while selecting the wavelength of the fundamental wave and a polarization beam splitter prism (polarization splitting element) 30 for introducing the fundamental wave 23 as an output to the wavelength conversion element 25. The polarization beam splitter prism 30 fulfills a function of transmitting the excitation light 27 to couple the laser light source 28 and the fiber 26 and reflecting the fundamental wave 23 emitted from the fiber 26 to introduce it to the wavelength converter 25, and prevents light generated in the fiber laser 22 from returning to the laser light source 28 (excitation light source).

Next, a basic laser operation of the fiber laser 22 is described. The excitation light 27 from the semiconductor laser light source 28 in FIG. 1 passes through the polarization beam splitter prism 30 after being converted into a parallel light by a collimator lens 32a. The excitation light 27 is further condensed by a condenser lens 32b to be incident on the fiber 26 through a second reflection surface 33 of the fiber 26. The incident excitation light 27 propagates in the fiber 26 while being absorbed by a laser-active material contained in the fiber 26. After passing through the fiber grating 29, the excitation light 27 is reflected by a first reflection surface 34 to return in the fiber 26 while being absorbed by the laser-active material and disappears by being substantially entirely absorbed by the laser-active material during a round trip before reaching the second reflection surface 33. Conventionally, an excitation light is absorbed while propagating in one direction in a fiber, wherefore a gain for amplifying a fundamental wave decreases in the propagation direction of the excitation light. On the other hand, in this embodiment, a gain for amplifying the fundamental wave is uniformly high in the fiber 26 since the excitation light 27 is absorbed while making a round trip in the fiber 26.

As described above, in this embodiment, a seed light of the fundamental wave 23 is generated in the fiber 26 while the excitation light 27 makes a round trip in the fiber 26 to be substantially entirely absorbed and the gain for amplifying the fundamental wave becomes uniformly high in the fiber 26. This seed light of the fundamental wave is amplified in a resonator using the second reflection surface 33 and the fiber grating 29 as a pair of reflection surfaces, and reciprocates by being reflected many times in this resonator, thereby reaching a laser oscillation.

It should be noted that the light of the laser oscillation is formed into a linearly polarized light by a condenser lens 36.

For example, a double-clad polarization maintaining fiber capable of causing the high-output excitation light 27 to propagate was used as the fiber 26 in this embodiment. Accordingly, the excitation light 27 is absorbed by the laser-active material contained in the fiber 26 while propagating in a relatively wide region including a core of the fiber 26 and an inner cladding. Further, the high-output excitation light 27 can be used since it can propagate in the wide range.

The fundamental wave 23 outputted from the fiber 26 in this way emerges from the second reflection surface 33, is converted into a parallel light by the condenser lens 32b and reaches the polarization beam splitter prism 30. A surface 35 of the polarization beam splitter prism 30 is designed to select a polarization direction so as to transmit light in the polarization direction of the excitation light 27 while reflecting light in the polarization direction of the fundamental wave 23. Thus, the fundamental wave 23 is reflected by the reflection surface 35 of the polarization beam splitter prism 30 to be introduced to the wavelength conversion element 25.

Next, a basic operation of the wavelength conversion element 25 is described. A laser beam of the fundamental wave 23 is emitted from the fiber laser 22 as described above and condensed by a condenser lens 53 to be incident on the wavelength conversion element 25. When the fundamental wave 23 from the fiber laser 22 as an incident wave is converted by the nonlinear optical effect of the wavelength conversion element 25, it becomes a harmonic output 24 having a wavelength that is half that of the fundamental wave. This converted harmonic output 24 is partly reflected by a beam splitter 37, but the harmonic output 24 having passed through the beam splitter 37 is almost entirely emitted as an output beam of the wavelength converter 21.

A harmonic output 38 partly reflected by the beam splitter 37 is received by a light receiving element 39 and converted into an electrical signal used for the monitoring of the output beam of the wavelength converter 21. An output controller 40 regulates a drive current of the laser light source 28 by means of a laser current source 41 for excitation so that the intensity of the converted signal becomes an intensity to give a desired output in the wavelength converter 21. The output controller 40 also regulates temperature with an accuracy of 0.01° C. by means of Peltier elements 46, 47 so as to maximize the harmonic output 24. Then, the intensity of the excitation light 27 from the laser light source 28 is regulated and the output intensity of the fundamental wave 23 of the fiber laser 22 is regulated, with the result that the output intensity of the wavelength converter 21 is regulated. Thus, the output intensity of the wavelength converter 21 is kept constant by a so-called automatic power control (hereinafter, abbreviated as "APC"). In order to more accurately control the output intensity of the wavelength converter 21 by the APC, a light receiving element 42 may be arranged at the outer side of the first reflection surface 34 of the fiber 26. In this way, it is possible to detect the fundamental wave 23 slightly leaking out without being reflected by the fiber grating 29 or to detect the excitation light 27 slightly leaking out without being reflected by the first reflection surface 34. By respectively estimating the intensities of the entire excitation light 27 and fundamental wave 23 based on these detection data, the output controller 40 regulates a drive current of the laser light source 28 by means of the laser current source 41 for excitation to control the output intensity of the wavelength converter 21 by the APC. Similarly, it is also possible to detect a part 44 of the excitation light slightly reflected by a surface 43 opposite to the reflection surface 35 for reflecting the fundamental wave 23 in the polarization beam splitter prism 30 by means of a light receiving element 50, to estimate the intensity of the entire excitation light 27 based on the part 44 of the excitation light and to control the output intensity of the wavelength converter 21 by the APC of the output controller 40.

In this embodiment are proposed a method for preventing the deterioration of an excitation laser diode (excitation light source 28) and the wavelength conversion element 25 and a method for preventing the generation of a giant pulse of the ASE due to inadvertent disturbance even if the giant pulse of the ASE is generated.

First, a construction for avoiding the deterioration of excitation light source 28 and the wavelength conversion element 25 in the case of the generation of the giant pulse of the ASE is described with reference to FIGS. 2 and 3.

Figure 2:
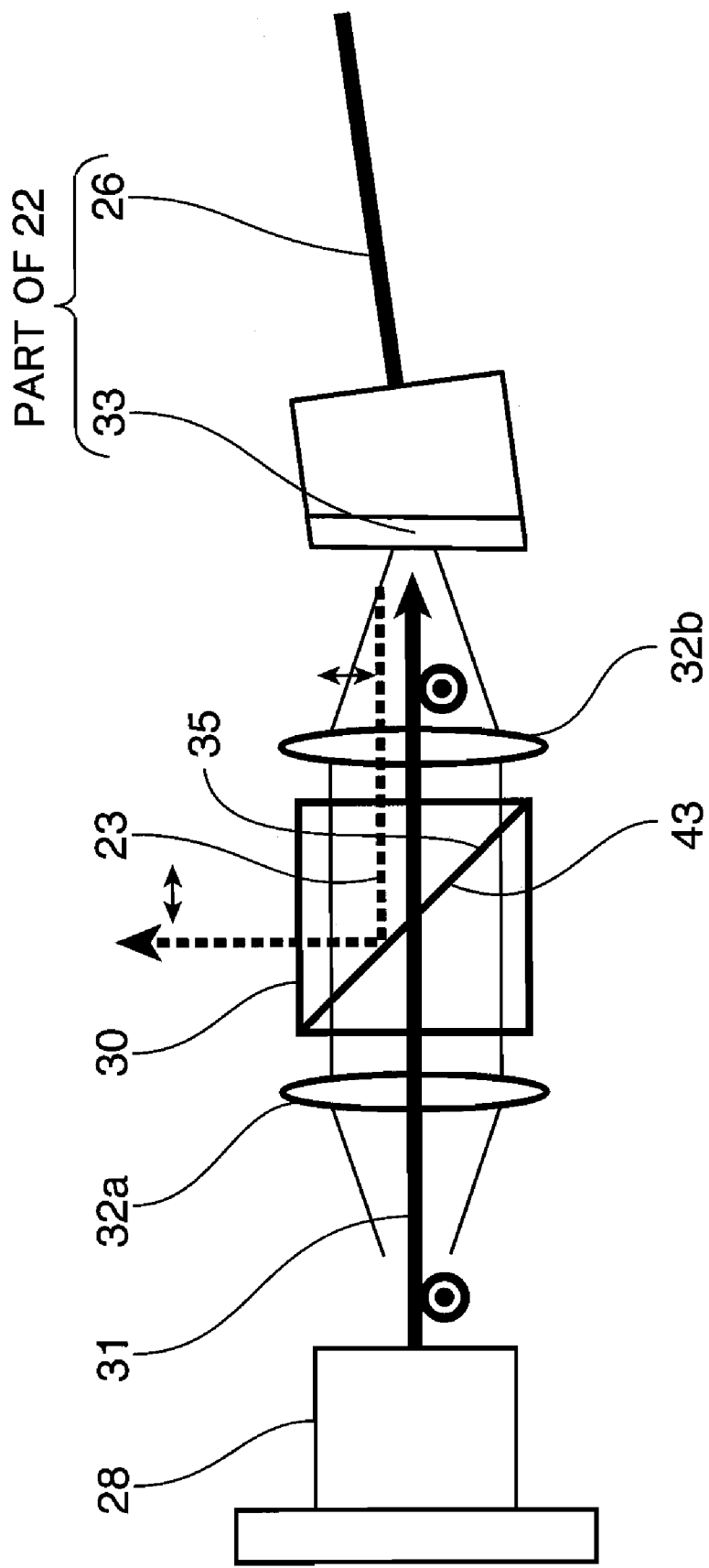
FIG. 2 is an enlarged view of an excitation light coupling portion from an excitation light source to a fiber laser portion.

FIG. 2 is a diagram showing a coupling portion for optically coupling an excitation light 31 to the fiber laser 22. The excitation light 31 emitted from the excitation light source 28 is converted into a parallel light by the collimator lens 32a. Subsequently, the excitation light 31 passes through the polarization beam splitter prism 30 and is coupled to the second reflection surface 33 of the fiber laser 22 by the coupling lens 32b to be introduced to the fiber 26. The fundamental wave 23 generated in the fiber laser 22 emerges from the second reflection surface 33 while containing not only light having a desired wavelength, but also light inadvertently generated by the ASE or the like. At this time, since the fiber laser 22 is oscillated by a linearly polarized light by including the polarization maintaining fiber such as a PANDA and a single polarization element such as a polarizer, the fundamental wave 23 emerging from the second reflection surface 33 is also a linearly polarized light. On the other hand, a semiconductor laser light source is generally used as the excitation light source 28, and the oscillated light is a substantially linearly polarized light (in this embodiment, in a polarization direction parallel to a surface of a substrate where a semiconductor laser is formed: TE polarized light). Thus, the propagation direction of the fundamental wave 23 generated in the fiber laser 22 and that of the excitation light 31 generated in the excitation light source 28 can be changed by causing the polarization directions of the excitation light 31 and the fundamental wave 23 to orthogonally intersect with each other beforehand and using the polarization beam splitter prism 30. In other words, the excitation light 31 generated in the excitation light source 28 is caused to pass as it is and the fundamental wave 23 having a polarization component orthogonally intersecting with the excitation light 31 is emitted while having the direction thereof changed by 90° and is not incident on the excitation light source 28 as shown in FIG. 2. Therefore, the deterioration of the excitation light source 28 by a laser beam inadvertently generated in the fiber laser 22 can be prevented.

A method for preventing optical damage from being given to the wavelength conversion element 25 by the inadvertently generated giant pulse of the ASE is described with reference to FIG. 3. The fundamental wave 23 emitted from the fiber laser 22 passes through the collimator lens 32b (coupling lens for the excitation light 31) to become a parallel light, which is then reflected by the reflection surface 35 of the polarization beam splitter prism 30 while having the propagation direction thereof changed by 90°. Thereafter, this light passes through a light limiter 51 and condensed to the wavelength conversion element 25 via the condenser lens 53, whereby a green beam or blue beam as a second harmonic is emitted. Here, the operation of the light limiter 51 is described. This light limiter is made of a KTP ($KTiOPO_4$) crystal having a length of 5 mm in the propagation direction of the fundamental wave 23, and is used in combination with a heater 52. Upon the incidence of a light having a large peak intensity on the KTP crystal, a part of the KTP crystal where the light passed turns brownish. This phenomenon is called photodarkening. Although it also depends on the construction of the fiber laser, the ASE occurs at a wavelength near 1085 nm in the construction of this embodiment. Thus, the KTP crystal is arranged such that the orientation thereof conforms to type-II phase matching angle in relation to 1085 nm. Thus, there is no likelihood that a light having a wavelength of 1060 nm is phase-matched to emit a green beam in the KTP crystal. Further, if the giant pulse of the ASE is incident on this KTP crystal to cause discoloration, coloring can be removed by heating the KTP crystal to about 150° C. using the heater 52.

Figure 3:
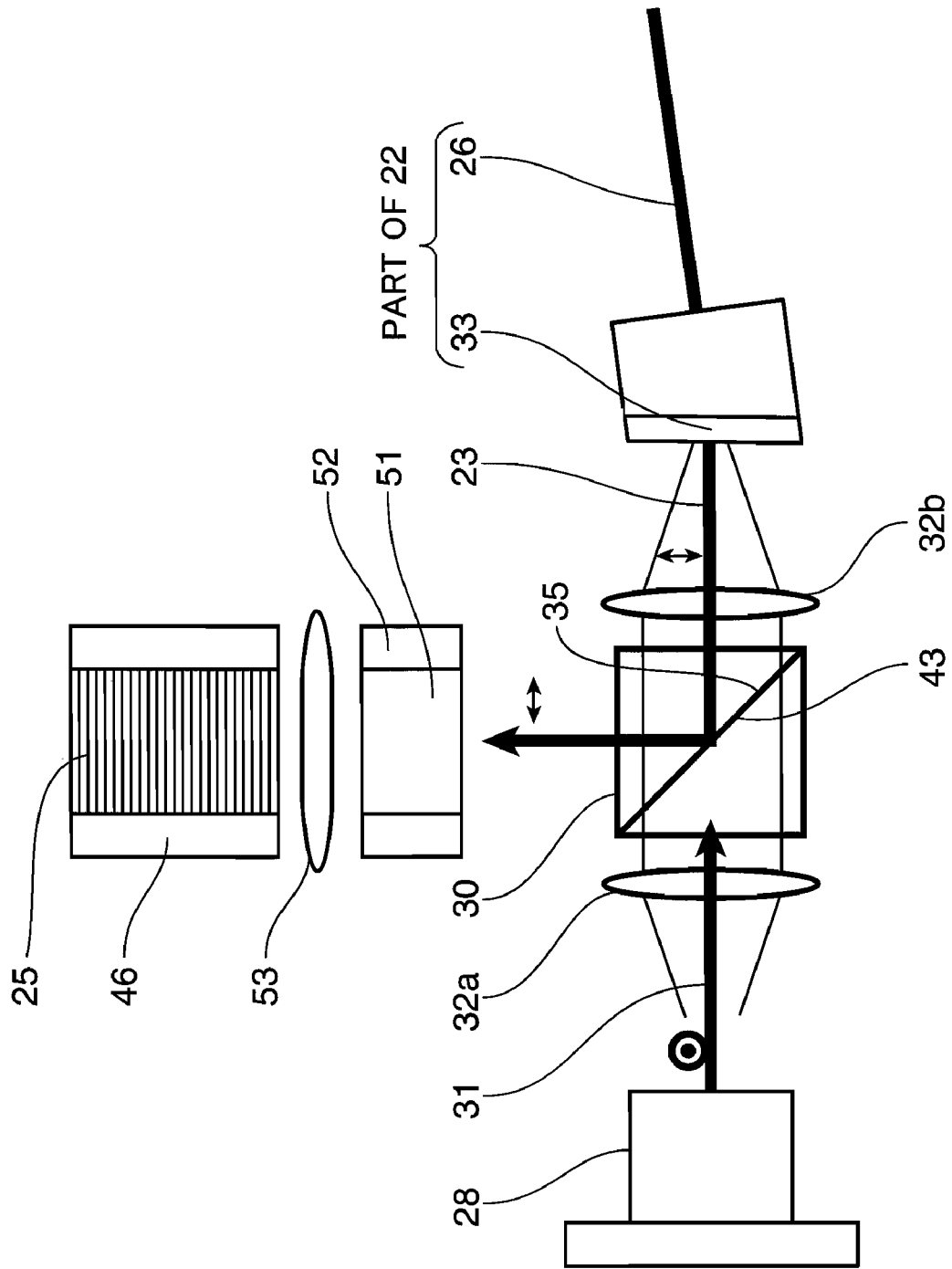
FIG. 3 is an enlarged view showing a construction from the excitation light source to the fiber laser portion and a wavelength conversion crystal portion.

At this time, the second reflection surface 33 of the fiber laser 22 is preferably normal to the propagation direction of the excitation light as shown in FIGS. 2 and 3 in order to maximize the optical coupling efficiency of the excitation light.

CrYAG as a supersaturation absorber is suitable as a material that acts as the above light limiter.

Figure 4:
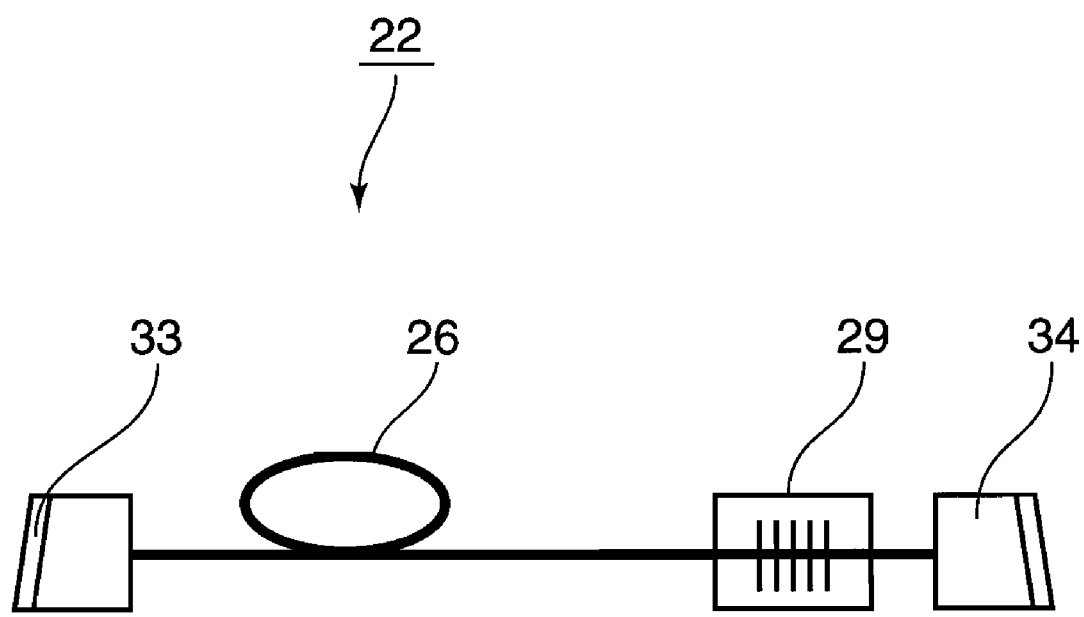
FIG. 4 is an enlarged view showing a processing to the opposite end faces of a fiber and a fiber polarizer in a fiber laser.
Figure 5:
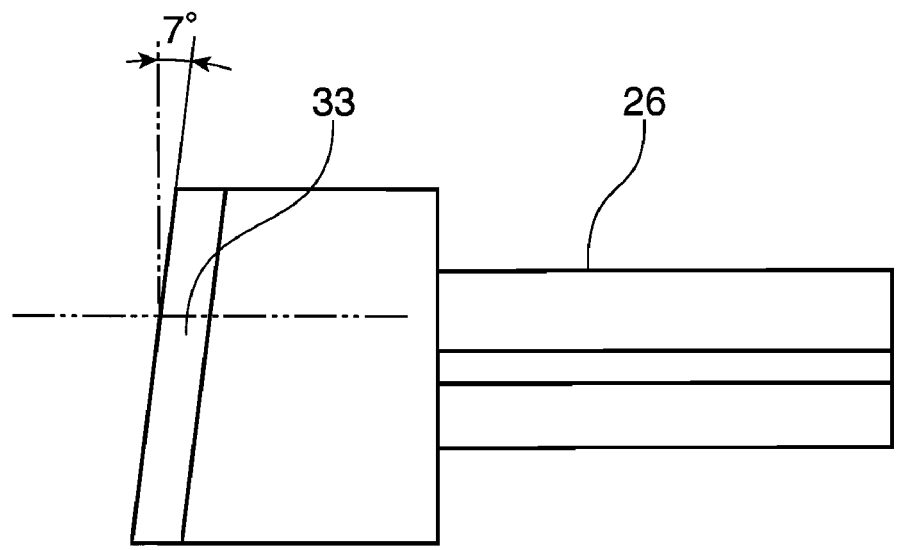
FIG. 5 is a view enlargedly showing a part of FIG. 4.
Figure 6:
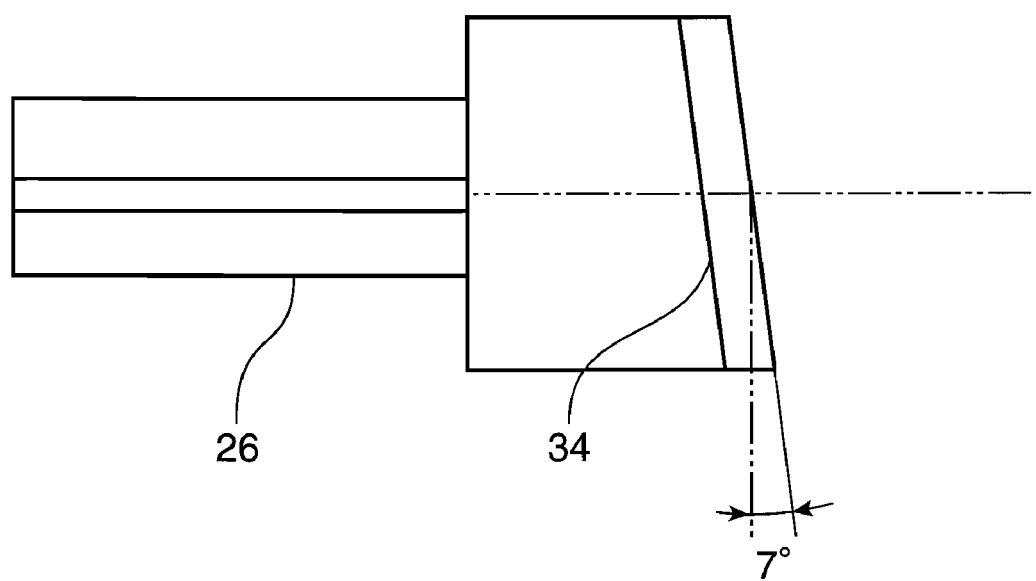
FIG. 6 is a view enlargedly showing a part of FIG. 4.
Figure 7:
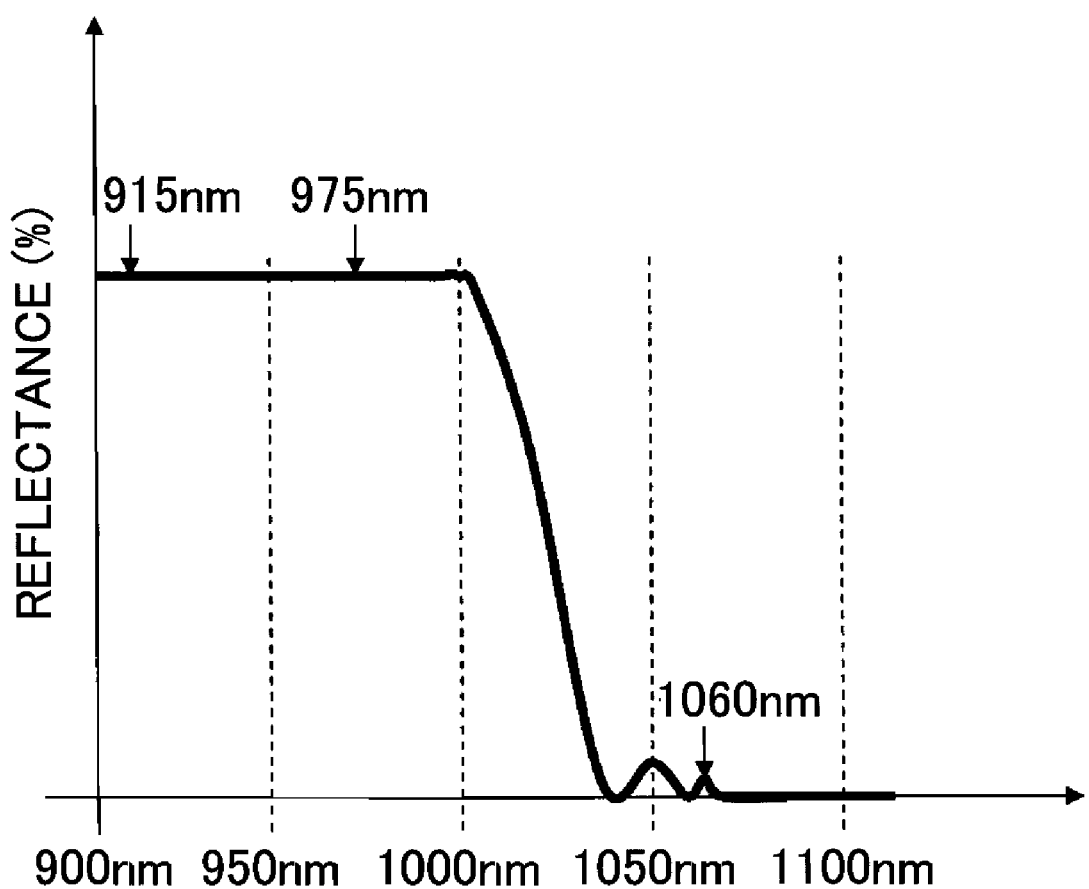
FIG. 7 is a graph showing an exemplary optical characteristic of a reflection film formed on a fiber end face of the fiber laser.

Further, in order to prevent the generation of the giant pulse of the ASE, the opposite end faces of the fiber are at an angle of 7° or larger with respect to a direction normal to the axial line of the fiber 26 as shown in FIGS. 4 to 6. It is necessary not to make the second and first reflection surfaces 33, 34 parallel to each other for the prevention of the giant pulse generation. Specifically, by inclining the opposite end faces of the fiber, a resonator having a small Q-value can be constructed by the opposite end faces of the fiber at the time of strong excitation, wherefore the generation of the ASE can be suppressed. In the drawings of the present application, the ends of the fiber are intentionally enlarged to make the shapes of the fiber end faces easily understandable and, actually, no large members are attached to the end faces. The first reflection surface 34 has such a coating as to fully reflect lights having wavelengths of 915 nm and 975 nm as excitation lights and to fully transmit (low reflection) lights having a wavelength of 1060 nm generated by the fiber laser 22. In this state, if it is set that the reflectance of the fiber grating 29 is larger than that of the coating in an oscillation wavelength range of the fiber laser 22, the generation of the ASE at the time of strong excitation can be prevented. FIG. 7 is a plot chart showing an exemplary optical characteristic of the coating applied to the first reflection surface 34.

Figure 8:
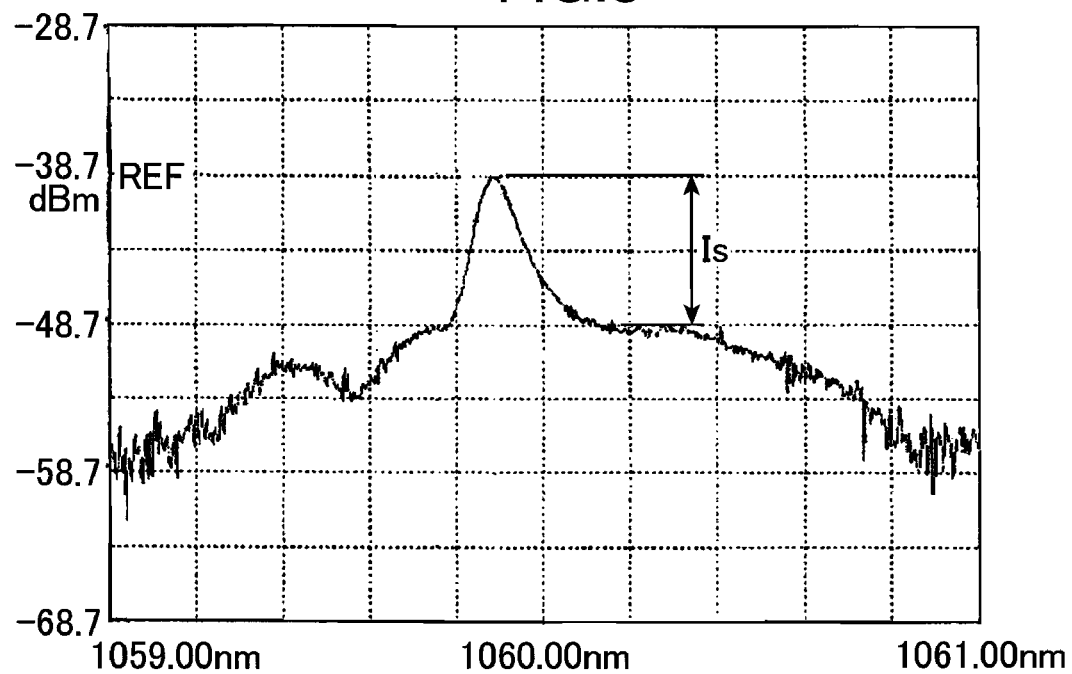
FIG. 8 is a graph showing an oscillation spectrum at the time of an output of 8 W at 1060 nm as an exemplary oscillation spectrum of the fiber laser in the case where a method disclosed in embodiments of the present application was not adopted.
Figure 9:
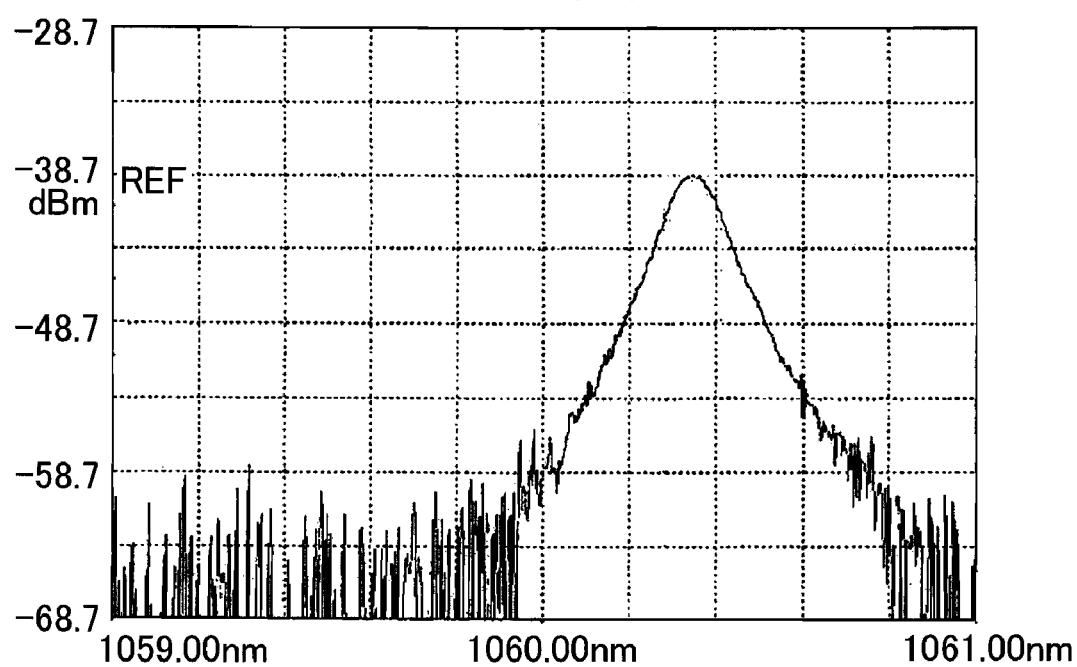
FIG. 9 is a graph showing an oscillation spectrum at the time of an output of 8 W at 1060 nm as an exemplary oscillation spectrum of the fiber laser in the case where the method disclosed in the embodiments of the present application was adopted.

Oscillation spectra of the fiber laser in the case where the aforementioned countermeasure was taken and in the case where it was not taken are shown in FIGS. 8 and 9. FIG. 8 shows the spectrum in the case where the countermeasure was not taken and FIG. 9 shows the spectrum in the case where it was taken. In both cases, an output of 9 W having a wavelength of 1060 nm was obtained from the fiber laser 22. In FIG. 8, broad oscillation is confirmed also at a baseline. This broad oscillation begins to be confirmed when the output becomes 7 W or more and the oscillation at the baseline increases thereafter as the excitation is more intensified. This is caused by the ASE. Here, if an inadvertent reflected light is incident from the outside, a giant pulse is generated and an oscillation beyond the oscillation wavelength range specified by the fiber grating 29 occurs, thereby becoming the cause of destroying the excitation light source and the optical elements. On the other hand, although a similar output is obtained in FIG. 9, it can be understood that the generation of light energy is suppressed at a baseline and that light is obtained only at a desired wavelength. As described above, the generation of the ASE can be suppressed and the destruction of the excitation light source and the optical elements caused by the generation of a giant pulse can be prevented by adopting the construction of this embodiment.

Here, a relationship between the fundamental wave 23 and the giant pulse is described. As the intensity of the fundamental wave 23 is increased, the occurrence frequency of the ASE also increases. In other words, it means that the smaller the range indicated by Is in FIG. 8 from the base line of the fundamental wave to the peak (hereinafter, referred to as "isolation Is"), the higher the occurrence frequency of the giant pulse. Specifically, it was experimentally found out that the occurrence frequency of the giant pulse is higher when the isolation Is is smaller than 20 dB as a reference. This is specifically verified with reference to FIGS. 10 and 11.

Figure 10:
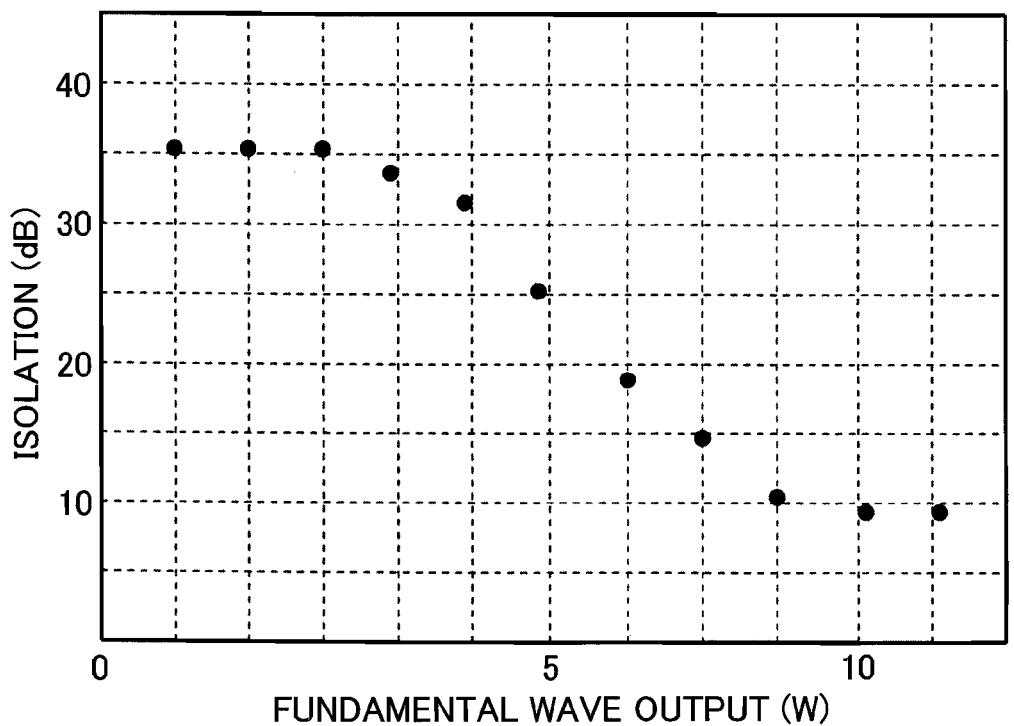
FIG. 10 is a chart showing isolation Is in relation to fundamental wave output upon generating a fundamental wave having a wavelength of 1064 nm.

FIG. 10 is a chart showing the isolation Is in relation to fundamental wave output upon generating a fundamental wave having a wavelength of 1064 nm. As can be understood from this chart, the isolation Is is below 20 dB when the output is slightly below 7 W in the case of generating the fundamental wave having a wavelength of 1064 nm.

Figure 11:
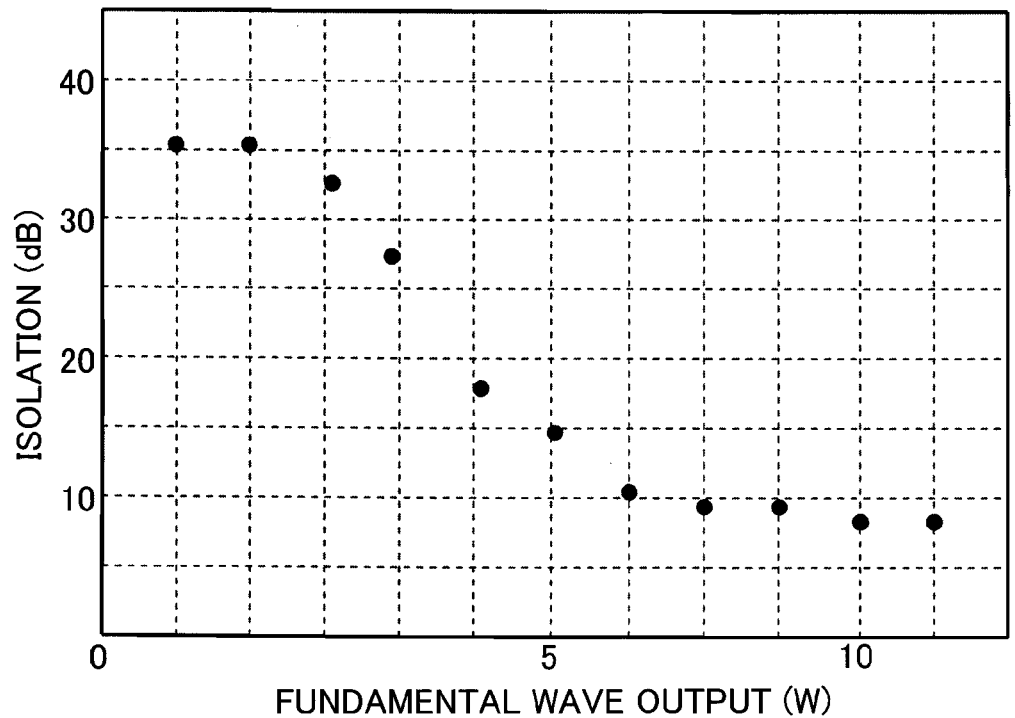
FIG. 11 is a chart showing isolation Is in relation to fundamental wave output upon generating a fundamental wave having a wavelength of 1160 nm.

FIG. 11 is a chart showing the isolation Is in relation to fundamental wave output upon generating a fundamental wave having a wavelength of 1160 nm. As can be understood from this chart, the isolation Is is below 20 dB when the output is slightly below 5 W in the case of generating the fundamental wave having a wavelength of 1160 nm.

Accordingly, if the wavelength converter 21 is used with the output of the fundamental wave set to 7 W or more in the case of generating the fundamental wave having a wavelength of 1064 nm and set to 5 W or more in the case of generating the fundamental wave having a wavelength of 1160 nm, the high-output fundamental wave 23 can be obtained. A giant pulse is thought to be generated if the output of the fundamental wave is set at these values, but the return of this giant pulse to the laser light source 28 can be effectively hindered by the polarization beam splitting prism 30.

When the wavelength of the excitation light 27 was set to 976 nm utilizing the wavelength converter 21 constructed as shown in FIG. 1, it was confirmed that a green laser beam of 4 W was obtained with an excitation light of 9 W and the harmonic output could be obtained with high efficiency.

Since the length of the fiber can be half the conventional length in this embodiment, an absorbed amount of the fundamental wave in the fiber can also be halved. Accordingly, a fundamental wave having a shorter wavelength than the one used in this embodiment can be emitted at a high output of about 10 W by regulating the kind and amount of a rare-earth element to be doped into the fiber, wherefore a W-class green laser beam having a short wavelength of 510 nm to 540 nm can be obtained.

Second Embodiment

Figure 12:
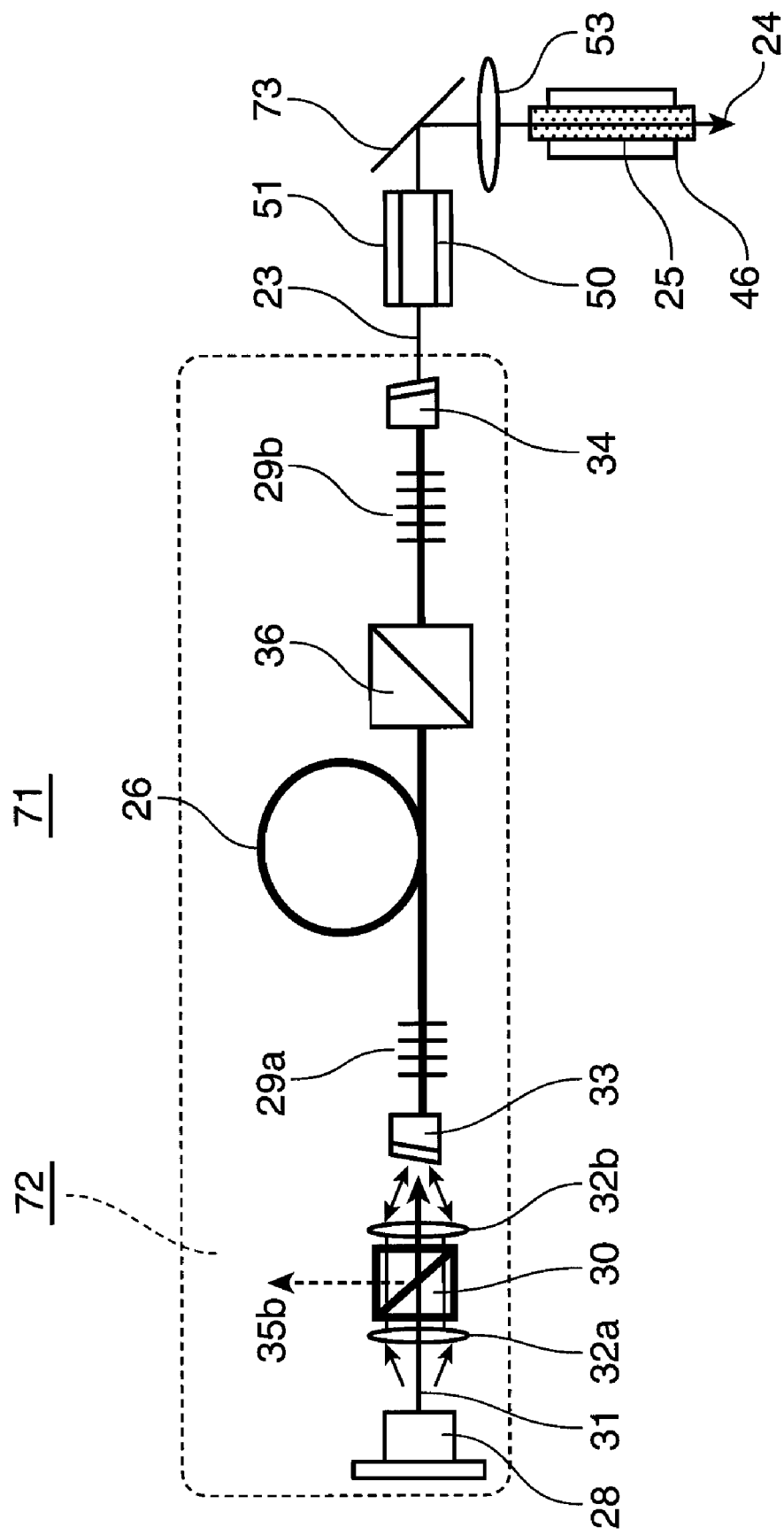
FIG. 12 is a schematic construction diagram of a wavelength converter according to a second embodiment of the invention.

FIG. 12 shows a second embodiment of the present invention. A wavelength converter 71 and a fiber laser 72 according to the second embodiment are so constructed as to realize functions similar to those of the first embodiment by another mode. The construction of the second embodiment is successively described with reference to FIG. 12. Structural differences are that a fiber laser resonator includes a pair of fiber Bragg gratings (FBG 29a, 29b: corresponding to a pair of reflection surfaces according to the present invention) and that an oscillating laser beam is emitted from an end surface different from an excitation light incident end.

As shown in FIG. 12, the wavelength converter 71 of this embodiment is provided with the fiber laser 72 and a wavelength conversion element 25 for converting a fundamental wave 23 emitted from the fiber laser 72 into a harmonic output 24.

The fiber laser 72 includes a laser light source 28 for emitting an excitation light 27 to be incident on a fiber 26, the fiber 26 internally formed with the FBGs 29a, 29b for reflecting the fundamental wave while selecting the wavelength of the fundamental wave and a polarization beam splitting prism 30 for preventing the incidence of an inadvertently generated ASE giant pulse on the excitation light source 28.

Originally, the fundamental wave 23 as a laser beam to be generated is emitted from a first reflection surface 34. The fundamental wave 23 passes through a light limiter 51 and propagates along an optical path bent by a reflecting mirror 73 to be incident on the wavelength conversion element 25, thereby being converted into a second harmonic.

Here, the reflection bandwidth of the FBG 29a is about 1 nm and the reflectance thereof is 99% or higher, and the reflection bandwidth of the FBG 29b is about 0.05 nm. It is preferable to have a relationship that the bandwidth of the FBG 29a is larger than that of the FBG 29b. A coating disclosed in the first embodiment and having the same specifications as in FIG. 7 is applied to the first reflection surface 34. A relationship between the reflectance of the FBG 29b and that of the first reflection surface 34 in the oscillation wavelength range of the fiber laser 72 needs to be such that the reflectance of the FBG 29b is larger than that of the first reflection surface 34. In the case of deviation from this relationship, an ASE occurs as shown in FIG. 8 of the first embodiment. If an inadvertent reflected light is incident from the outside, it becomes a giant pulse, which becomes the cause of destroying the excitation light source and optical elements. Specifically, the reflectance of the FBG 29b (reflection surface closer to conversion element 25) is preferably set to 15% or higher and 20% or lower. If the reflectance is above 20%, laser efficiency decreases, therefore, the reflectance preferably lies in this range.

In order to prevent the generation of the ASE giant pulse, the opposite end faces of the fiber are formed to be at an angle of 70 or larger with respect to the direction normal to the axial line of the fiber as shown in FIGS. 4 to 6. It is necessary not to make the reflection surfaces 33, 34 parallel to each other in order to prevent the generation of the giant pulse. In other words, by inclining the end faces, a resonator having a small Q-value can be constructed by the opposite end faces of the fiber at the time of strong excitation, wherefore the generation of the ASE can be suppressed. In the drawings of the present application, the end faces of the fiber are intentionally enlarged to make the shapes of the fiber end faces easily understandable and, actually, no large members are attached to the end faces.

The construction of the second embodiment is functionally similar to that of the first embodiment.

Next, a basic operation of the wavelength conversion element 25 is described. The laser beam of the fundamental wave 23 is emitted from the fiber laser 22 as described above, and condensed by a condenser lens 53 to be incident on the wavelength conversion element 25. This fundamental wave 23 from the fiber laser 22 is converted by the nonlinear optical effect of the wavelength conversion element 25 to become the harmonic output 24 having a wavelength that is half that of the fundamental wave 23.

Using the wavelength converter 71 constructed as above, a W-class green beam was obtained from the wavelength conversion element 25 similar to the first embodiment. However, since this construction is not for returning the fundamental wave, excitation light efficiency decreases and conversion efficiency into a green beam from the applied power decreases. Therefore, in terms of efficiency, the first embodiment is more preferably used.

Third Embodiment

In a third embodiment is illustrated an example in which the wavelength conversion element shown in the first and second embodiments is applied to a display.

Figure 13:
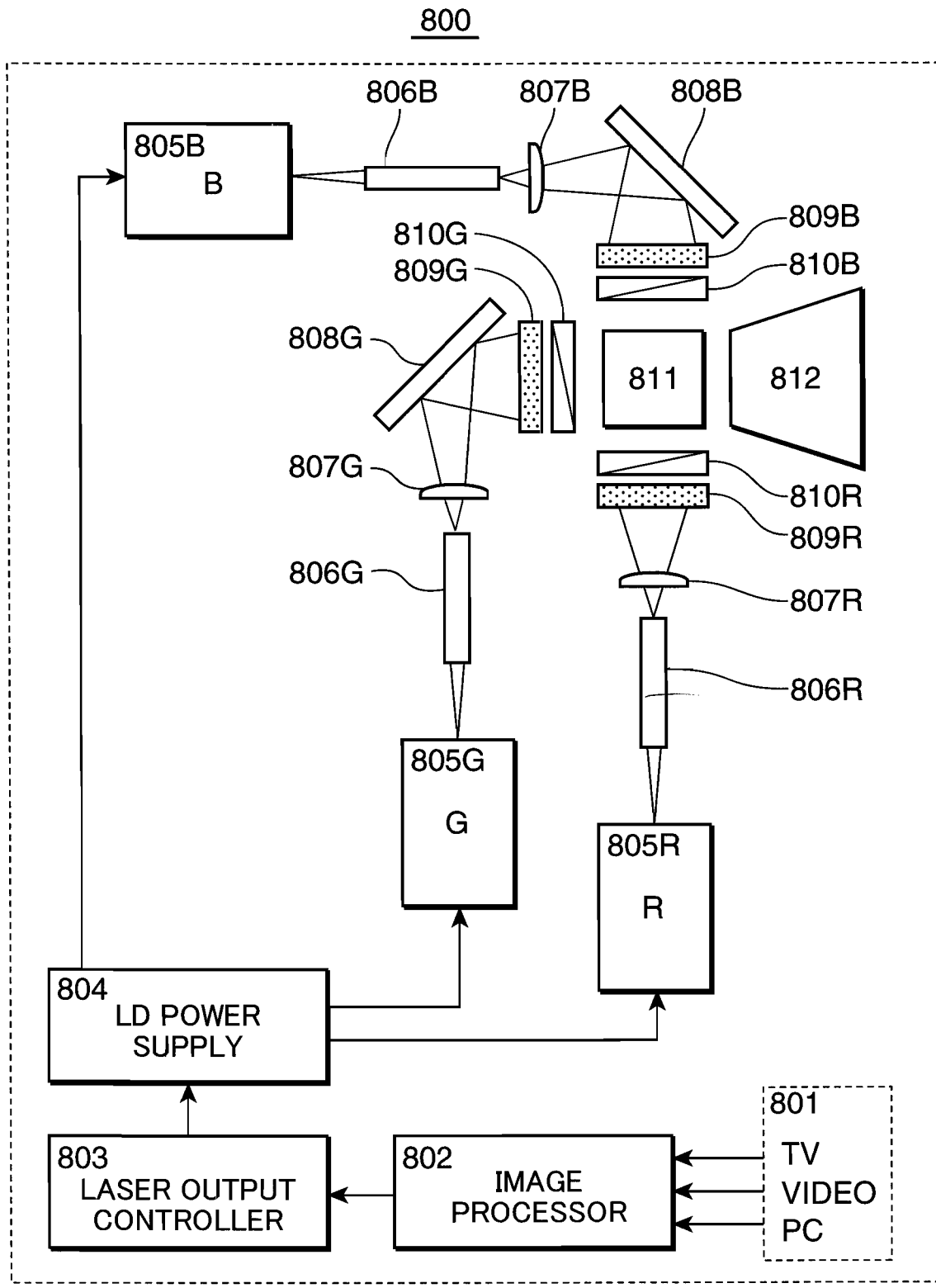
FIG. 13 is a diagram showing an example of a 2D image display device adopting a wavelength conversion light source according to the invention.

As shown in FIG. 13, a 2D image display device 800 of this embodiment is an example in which the content of the present application is applied to an optical engine of a liquid crystal three-plate projector. The 2D image display device 800 is provided with an image processor 802, a laser output controller (controller) 803, an LD power supply 804, red, green and blue laser light sources 805R, 805G and 805B, beam forming rod lenses 806R, 806G and 806B, relay lenses 807R, 807G and 807B, reflecting mirrors 808G, 808B, 2D modulation elements 809R, 809G and 809B for displaying images, polarizers 810R, 810G and 810B, a multiplexing prism 811 and a projection lens 812.

The green laser light source 805G is the wavelength conversion light source described in the first and second embodiment and is controlled by the laser output controller 803 and the LD power supply 804 for controlling the output of a green light source.

Laser beams from the respective light sources 806R, 806G and 806B are shaped into rectangular beams, which illuminate the 2D modulation elements of the respective colors through the relay lenses 807R, 807G and 807B. The two-dimensionally modulated images of the respective colors are multiplexed by the cross prism 811 and projected onto a screen by the projection lens 812 to be displayed as a video image.

If the green laser light source 805G is a system in which a laser resonator is closed in a fiber, an output reduction with time and an output variation resulting from an increase of loss in the resonator due to dust from the outside or the misalignment of the reflection surfaces can be suppressed.

On the other hand, the image processor 802 generates a light quantity control signal for varying an output of a laser beam in accordance with the luminance information of an inputted video signal 801 and sends it to the laser output controller 803. By controlling the light quantity in accordance with the luminance information, contrast can be improved.

Figure 14:
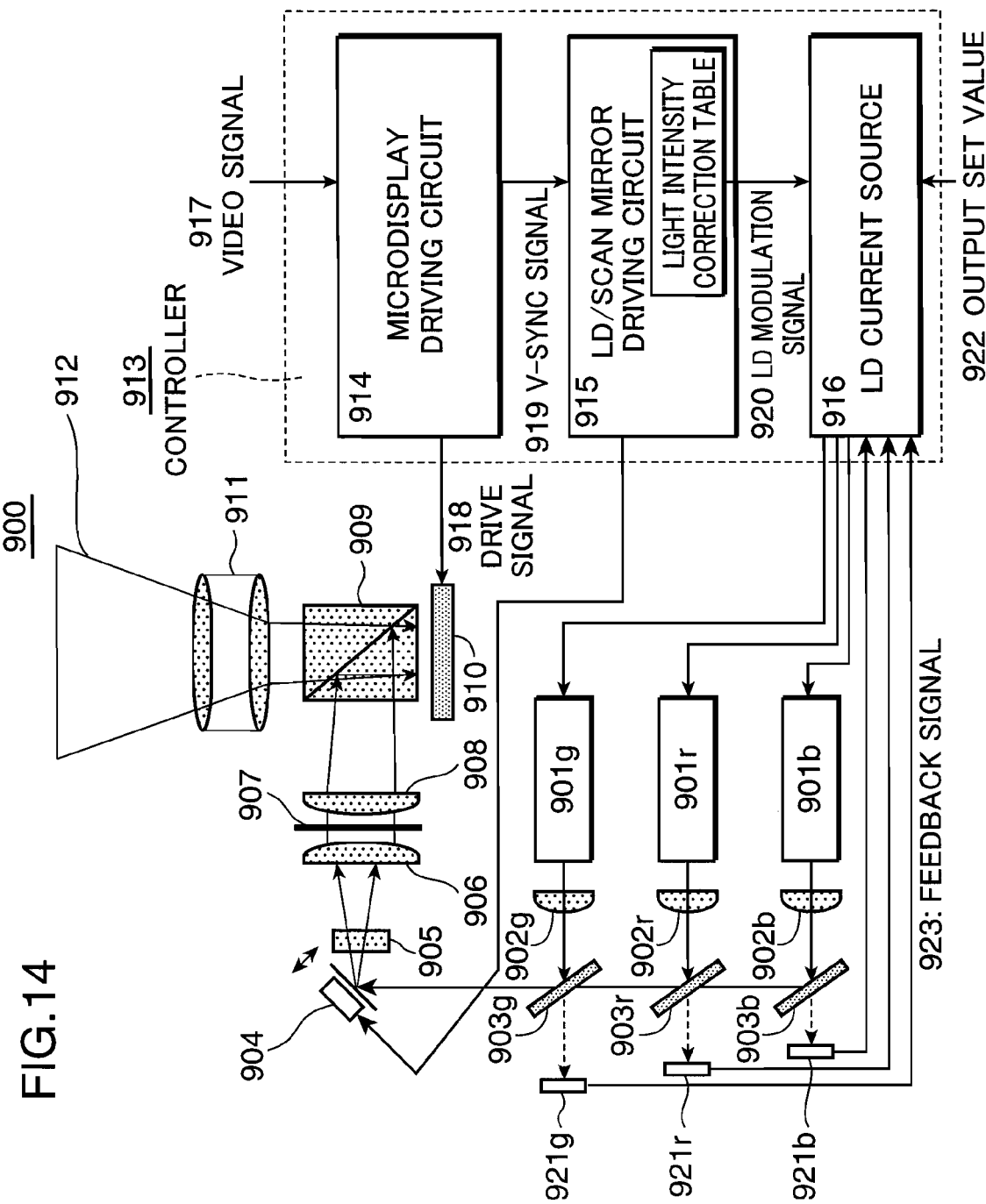
FIG. 14 is a diagram showing an example of a 2D image display device in the case of adopting the wavelength conversion light source according to the invention, using only one 2D modulation element and performing a field sequential operation.

A construction example of a projector using only one 2D modulation element is shown in FIG. 14.

In the mode shown in FIG. 14, a ferroelectric element LCOS is used as the 2D modulation element. Laser beams emitted from a red laser light source 901r, a green laser light source 901g and a blue laser light source 901b are collimated into parallel beams by collimator lenses 902r, 902g and 903b. Mirrors 903r, 903g and 903b are dielectric multilayer mirrors respectively having reflection characteristics in a red region (wavelength of 600 nm or longer), a blue region (wavelength of 400 to 460 nm) and a green region (wavelength of 520 to 560 nm). The lenses 902r, 902g and 902b and the mirrors 903r, 903g and 903b are adjusted such that the beam paths of the red, green and blue light sources are coaxial immediately after the mirror 903g. Identified by 904 is a scan mirror for scanning the beam in an inward direction on the plane of FIG. 14. A lens 905 is a cylindrical lens for shaping the beam into a linear emission line. Lenses 906, 908 are a relay lens and a field lens. Identified by 907 is a diffuser plate arranged between the relay lens 906 and the field lens 908 and adapted to further shape the beam, which was shaped into the linear emission line by the cylindrical lens 905, into a strip-like beam. A polarizing prism 909 is a polarization beam splitter.

Identified by 910 is a 2D modulation element (LCOS). Since the LCOS 910 is turned on and off by rotating the polarization direction of the beam, the polarizing prism 909 needs to be a polarization beam splitter. The beam multiplexed and having the optical path scanned by the scan mirror 904 is incident on the prism 909 as an S-polarized beam. Since a reflection film in the prism 909 is designed to reflect the S-polarized beam, the S-polarized beam illuminates the LCOS 910.

The controller 913 includes a microdisplay driving circuit 914, an LD/scan mirror driving circuit 915 and a laser current source 916. A video signal 917 is inputted to the microdisplay driving circuit 914, which in turn generates a drive signal 918. Using a V-SYNC signal as one of the drive signals 918 as a trigger, a drive waveform of the scan mirror and an emission trigger representing a laser emission timing are generated. The emission trigger is inputted to the laser current source, and a current is supplied to the laser in synchronism with a trigger signal. The V-SYNC signal 919 is a pulse signal of 60 Hz, and a laser emission signal of 120 Hz is generated in accordance with the V-SYNC signal 919 in the case of 2×-speed. In other words, a signal of n·60 Hz is generated in the case of n×-speed. A duty ratio determining a laser emission time is determined by a driving method for the 2D modulation element. Further, outputs of the red, green and blue lasers 901r, 901g and 901b are monitored by photodetectors 921r, 921g and 921b, and feedbacks are given to the LD current source 916. The emission intensities of the respective lasers can be made uniform by comparing the products of an LD modulation signal 920 and LD output set values 922 with monitor signals from the photodetectors 921r, 921g and 921b.

Figure 15:
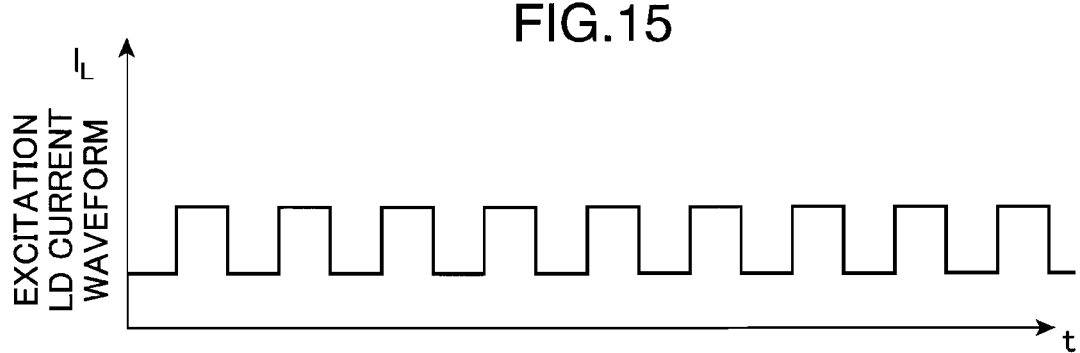
FIG. 15 is a plot chart showing the waveform of an applied current at the time of modulation in the case of adopting a wavelength conversion light source having a conventional construction.
Figure 16:
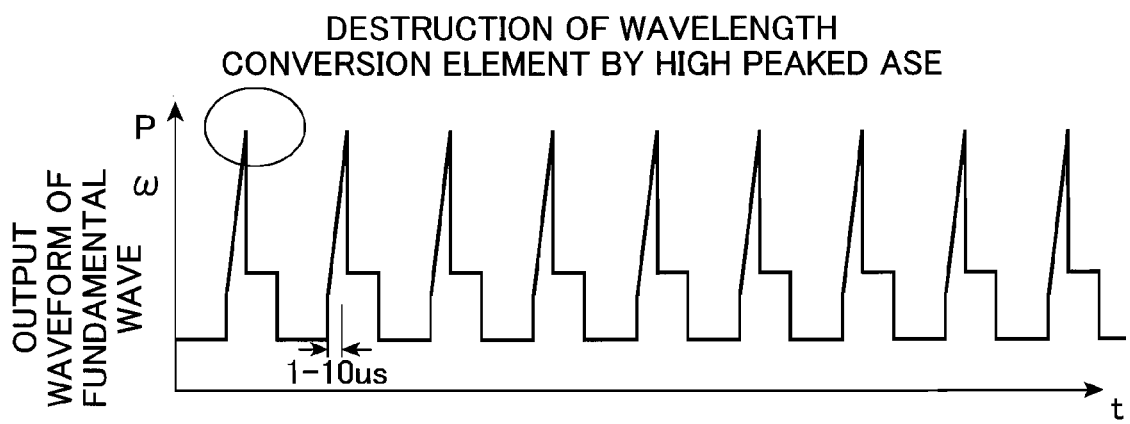
FIG. 16 is a plot chart showing the output waveform of a fundamental wave at the time of modulation in the case of adopting the wavelength conversion light source having the conventional construction.
Figure 17:
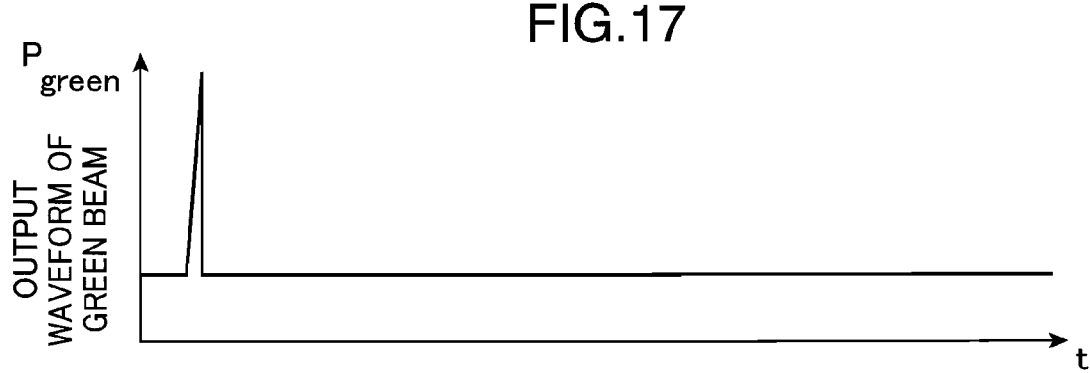
FIG. 17 is a plot chart showing the output waveform of a second harmonic (green beam) at the time of modulation in the case of adopting the wavelength conversion light source having the conventional construction.

In the display application as above, pulsed emission is, in some cases, carried out at the time of changing colors upon performing a light quantity control and a field sequential control. In such cases, in a light source using a fiber laser having a conventional construction, if a current having a rectangular waveform is inputted as an excitation current as shown in FIG. 15, ASE pulses having a high peak are generated when the pulse rises as shown in FIG. 16, which has caused a problem of deteriorating a wavelength conversion element and an excitation laser. In such a case, laser damage was given to the wavelength conversion element and no green beam could be obtained as shown in FIG. 17. On the other hand, if the wavelength conversion light source of the first and second embodiments is used, the generation of ASE pulses having a high peak can be prevented since amplified spontaneous emission as the cause is suppressed as shown in FIG. 8 and FIG. 9.

Figure 18:
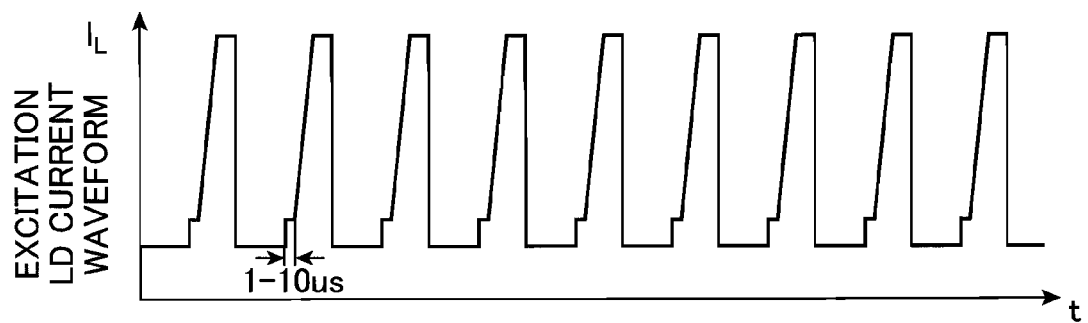
FIG. 18 is a plot chart showing the waveform of an applied current at the time of modulation in the case of adopting a wavelength conversion light source having an inventive construction.
Figure 19:
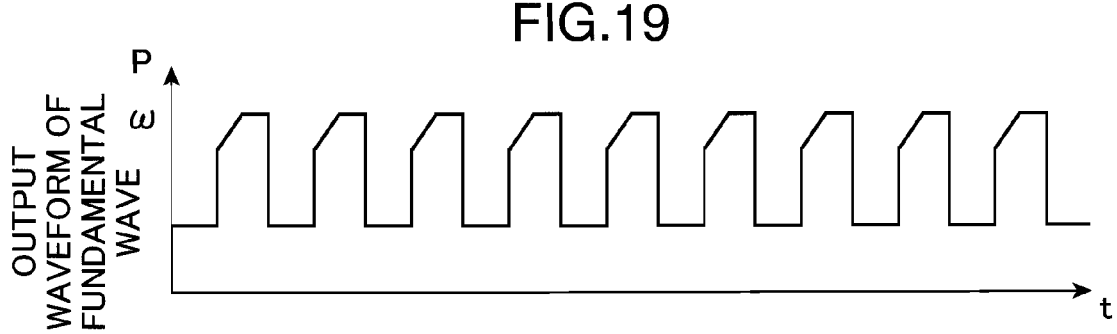
FIG. 19 is a plot chart showing the output waveform of a fundamental wave at the time of modulation in the case of adopting the wavelength conversion light source having the inventive construction.
Figure 20:
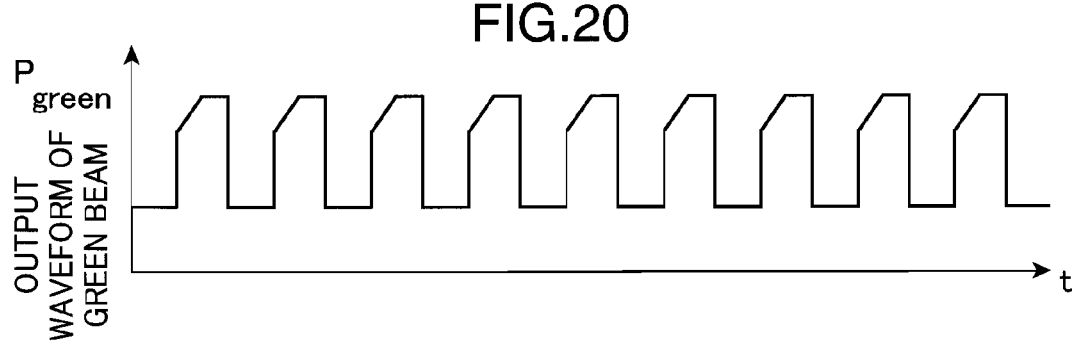
FIG. 20 is a plot chart showing the output waveform of a second harmonic (green beam) at the time of modulation in the case of adopting the wavelength conversion light source having the inventive construction.

Further, in the case of using the wavelength conversion light source of the first and second embodiment, the generation of ASE pulses can be more reliably prevented as shown in FIG. 19 by maintaining the current value equal to or above a threshold value of the fiber laser light source for a period of 1 to 10 µs or by starting while increasing a current at a constant rate until exceeding a threshold current as shown in FIG. 18. As a result, a green beam having an output waveform as shown in FIG. 20 could be emitted.

Besides the 2D image display devices having the above constructions, a mode for projecting light from behind a screen (rear projection display) can be adopted.

By adopting a construction to illuminate a liquid crystal panel with lights of three primary colors R, G and B from behind the panel, the wavelength conversion light source can also be used as a backlight source of a liquid crystal display.

Although spatial modulation elements made of a transmissive liquid crystal or a reflective liquid crystal are used in FIGS. 13 and 14, it is, of course, also possible to use 2D modulation elements using a galvanometer mirror or a mechanical micro switch (MEMS) represented by a DMD.

In the case of propagating a harmonic by an optical fiber to a light modulation element (such as a reflective spatial modulation element, a MEMS or a galvanometer mirror) having a light modulation characteristic little influenced by polarization components as in this embodiment, the optical fiber needs not be a polarization maintaining fiber such as a PANDA fiber. On the other hand, upon using a 2D modulation device made of a liquid crystal, it is preferable to use a polarization maintaining fiber since a modulation characteristic and a polarization characteristic largely relate to each other.

Although the fiber lasers used in the first to third embodiments are doped with Yb as a rare-earth element, other rare-earth elements, e.g. at least one rare-earth element selected from Nd, Er, Dy, Pr, Tb, Eu, Ce, Tm, Ho, Gd, Y, La and the like may be used. It is also possible to change a doped amount of the rare-earth element and to dope a plurality of rare-earth elements according to the wavelength and output of the wavelength converter.

Although a laser having a wavelength of 915 to 976 nm is used as the excitation laser light source of the fiber laser in the first to third embodiments, any laser light source having a wavelength outside the above wavelength range may be used provided that it can excite the fiber laser.

Although a periodically poled $MgO:LiNbO_3$ is used as the wavelength conversion element in the first to third embodiments, a wavelength conversion element made of another material and having another structure, e.g. potassium titanyl phosphate (KTP), $Mg:LiTaO_3$ or the like having a periodically poled structure may be used.

The aforementioned specific embodiments main embrace inventions having the following constructions.

A wavelength converter of the present invention comprises a laser resonator including a fiber containing an laser-active material and a fiber grating formed in the fiber; a laser light source for emitting an excitation light to the fiber; a polarization splitting element provided between the laser resonator and the laser light source; and a wavelength conversion element for converting a fundamental wave of a laser beam emitted from the laser resonator into a harmonic, wherein the laser resonator is constructed to emit a beam polarized in a direction normal to a polarization direction of the laser light source using a polarization maintaining fiber and a single polarization mechanism and includes a pair of reflection surfaces; the polarization splitting element is provided between one of the respective reflection surfaces closer to the laser light source and the laser light source to introduce an excitation light in a specified polarization direction emitted from the laser light source to the laser resonator while introducing the fundamental wave emitted from the laser resonator and having a polarization direction normal to the specified polarization direction in a direction deviated from the laser light source.

According to the wavelength converter of the present invention, the generation of an ASE that is problematic upon generating a laser beam in a 1 µm range using, for example, a Yb-doped fiber, can be suppressed, thereby being able to prevent the deterioration of an excitation laser light source and the destruction of a nonlinear optical crystal for wavelength-converting a laser beam.

Specifically, by inserting a polarization splitting element when a polarization direction of a laser light source for generating an excitation light and that of a light emitted from an oscillator are caused to orthogonally intersect to optically couple the laser light source and the oscillator, the introduction of a suddenly generated ASE to the laser light source can be suppressed. Thus, the deterioration of the excitation light source by the ASE can be prevented.

In the wavelength converter, it is preferable that the one of the respective reflection surfaces closer to the wavelength conversion element includes a dielectric multilayer film; and that the reflectance of the reflection surface closer to the wavelength conversion element in a fundamental wave oscillation wavelength range is 15% (inclusive) to 20% (inclusive). This reflectance is determined in consideration of the reflectance of an emergent end face of the fiber and the reflection from optical elements arranged outside such as the wavelength conversion element. The reflectance of the emergent end face of the fiber having no processing applied thereto is a maximum of about 5%, and isolation Is decreases in the case of strong excitation. Thus, in order to suppress the ASE, the reflectance of the reflection surface closer to the wavelength conversion element is preferably about three times as high as that of the end face of the fiber having no processing applied thereto.

Specifically, the reflectance of the second reflection surface 33 in the embodiment shown in FIG. 1 and that of the FBG 29b in the embodiment shown in FIG. 12 in the fundamental wave oscillation wavelength range can be set to 15% to 20%.

In addition, a laser resonator can be constructed by using a pair of fiber gratings. In this case, a reflectance of one of the fiber gratings in the fundamental wave oscillation range can be set to 98% or higher, and the bandwidth of the fiber grating can be set to 1 nm or longer. While a reflectance of the other fiber grating in the fundamental wave oscillation range can be set to 15% or higher and 20% or lower, the bandwidth of the fiber grating can be set to 0.1 nm or shorter.

For example, the reflectance of the fiber grating 29a closer to the laser light source 28 in the embodiment shown in FIG. 12 can be set to 98% or higher, and the bandwidth of the fiber grating 29a can be set to 1 nm or longer. While the reflectance of the fiber grating 29b far away from the laser light source 28 can be set to 15% or higher and 20% or lower, and the bandwidth of the fiber grating 29b can be set to 0.1 nm or shorter.

If the fiber end face of the fiber laser resonator is inclined by 7° or larger with respect to a direction normal to the longitudinal direction of the fiber in the wavelength converter, the generation of the ASE can be suppressed.

Particularly, if the two fiber end faces of the laser resonator are formed not to be parallel to each other, a resonator having a Q-value can be constructed by the opposite fiber end faces at the time of strong excitation, wherefore the generation of the ASE can be suppressed.

If the reflectance of the fiber grating having a narrow band is set to 15% or higher after the fiber end faces of the fiber laser resonator are inclined by 7° to 20°, the generation of an ASE in the case of strong excitation as well as that of a sudden ASE can be suppressed. Thus, according to the wavelength converter of the present invention, the life of the device can be extended and the reliability thereof can be improved even at the time of generating light in a 1 µm band by an Yb fiber laser having an excitation wavelength and an oscillation wavelength very close to each other.

The wavelength converter may be so constructed as to emit a green laser beam having a wavelength of 510 nm to 540 nm. Since a green laser output beam having a high luminosity factor can be obtained, color representation approximate to original colors can be made by using the wavelength converter in a display or the like having good color reproducibility.

In the above wavelength converter, if the laser-active material contains Yb and the wavelength of the fundamental wave is 1100 nm or longer and 1180 nm or shorter, the return of the ASE to the excitation light source can be suppressed by a dielectric filter since the wavelength of the excitation light (e.g. 915 nm, 975 nm) and that of the ASE are relatively distant from each other. However, since the polarization splitting element is used, a more easily designed construction can be adopted.

In the wavelength converter, it is preferable to provide a light limiter between the laser resonator and the wavelength conversion element. According to this construction, damage to the wavelength conversion element by the ASE can be reduced since further light transmission can be restricted when a light having a specified peak is incident.

Specifically, $KTiOPO_4$ or CrYAG can be used as the light limiter. In the case of using these, if a light having a specified peak intensity or higher is incident on the light limiter, a part where this light passed discolors so as to be able to restrict further light transmission. This discoloration can be removed by heating the light limiter using a heating function of a heating-function provided holder.

In the above wavelength converter, it is preferable that the output of the fundamental wave is 7 W or more upon generating the fundamental wave having a wavelength of from 1030 nm (inclusive) to 1100 nm (inclusive) or that the output of the fundamental wave is 5 W or more upon generating the fundamental wave having a wavelength of from 1100 nm (inclusive) to 1190 nm (inclusive).

Specifically, the larger the generated amount of the ASE, the higher the output of the fundamental wave. The occurrence frequency of the ASE changes according to the wavelength of the fundamental wave. This occurrence frequency of the ASE is experimentally found out to suddenly increase when the output of the fundamental wave exceeds 7 W when the wavelength of the fundamental wave is from 1030 nm (inclusive) to 1100 nm (inclusive) and when the output of the fundamental wave exceeds 5 W when the wavelength of the fundamental wave is 1100 nm (inclusive) to 1190 nm (inclusive). Therefore, by satisfying these conditions, a fundamental wave having a higher output can be obtained while the influence of the ASE is suppressed.

In the wavelength converter, the pair of reflection surfaces may be formed by fiber gratings.

In order to accomplish the above object, the present invention is also directed to a 2D image display device equipped with the above wavelength converter. Since this 2D image display device is constructed to control a light quantity in accordance with the luminance information of an inputted signal, contrast can be improved.

The above 2D image display device comprises a screen; a plurality of laser light sources; and a scan unit for scanning the laser light sources; wherein the laser light sources include at least light sources for emitting red, green and blue laser beams, and any one of the above wavelength converters is used as at least the green light source out of the laser light sources.

Since a green laser output beam having a high luminosity factor can be obtained by this construction, color representation approximate to original colors can be made by using the wavelength converter in a display or the like having a good color reproducibility.

The 2D image display device of the present invention equipped with the wavelength converter having such a property has a great effect of enabling a thin, highly efficient and low power consuming in addition to an effect of providing a high luminance, a wide color reproduction range and a high quality.

The 2D image display device equipped with the wavelength converter may comprise a single 2D modulation element to successively display red, green and blue colors in accordance with a V-SYNC signal of a video signal.

The 2D image display device equipped with the wavelength converter may be constructed to maintain a drive current value for each light source at or above a threshold value of the light source for a period of 1 to 10 µs when the waveform rises upon pulse oscillation.

The 2D image display device equipped with the wavelength converter may be constructed to increase a drive current value for each light source at a constant rate for a period of 1 to 10 μs when the waveform rises upon pulse oscillation.

Since the wavelength converter and the 2D image display device according to the present invention have a high luminance, a wide color reproduction range and low power consumption, they can be usefully applied in the display field including large-size displays and high-luminance displays.

This application is based on Japanese Patent Application No. 2007-001043 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A wavelength converter, comprising:
    a laser resonator including a fiber containing an laser-active material and a fiber grating formed in the fiber;
    a laser light source for emitting an excitation light to the fiber;
    a polarization splitting element provided between the laser resonator and the laser light source; and
    a wavelength conversion element for converting a fundamental wave of a laser beam emitted from the laser resonator into a harmonic,
    wherein:
    the laser resonator is constructed to emit a beam polarized in a direction normal to a polarization direction of the laser light source using a polarization maintaining fiber and a single polarization mechanism and includes a pair of reflection surfaces; and
    the polarization splitting element is provided between one of the respective reflection surfaces closer to the laser light source and the laser light source to introduce an excitation light in a specified polarization direction emitted from the laser light source to the laser resonator while introducing the fundamental wave emitted from the laser resonator and having a polarization direction normal to the specified polarization direction in a direction deviated from the laser light source.

2. A wavelength converter according to claim 1, wherein
    the one of the respective reflection surfaces closer to the wavelength conversion element includes a dielectric multilayer film; and
    the reflectance of the reflection surface closer to the wavelength conversion element in a fundamental wave oscillation wavelength range is 15% (inclusive) to 20% (inclusive).

3. A wavelength converter according to claim 1, wherein the fiber end face of the laser resonator is inclined by 7° or larger with respect to a direction normal to the longitudinal direction of the fiber.

4. A wavelength converter according to claim 1, wherein the two fiber end faces of the laser resonator are formed not to be parallel to each other.

5. A wavelength converter according to claim 1, wherein:
    the laser-active material contains Yb; and
    the wavelength of the fundamental wave is 1100 nm (inclusive) to 1180 nm (inclusive).

6. A wavelength converter according to claim 1, further comprising a light limiter provided between the laser resonator and the wavelength conversion element.

7. A wavelength converter according to claim 6, wherein the light limiter is made of $KTiOPO_4$ or CrYAG and is held by a holder having a heating function.

8. A wavelength converter according to claim 1, wherein the output of the fundamental wave is 7 W or more upon generating the fundamental wave having a wavelength of from 1030 nm (inclusive) to 1100 nm (inclusive).

9. A wavelength converter according to claim 1, wherein the output of the fundamental wave is 5 W or more upon generating the fundamental wave having a wavelength of from 1100 nm (inclusive) to 1190 nm (inclusive).

10. A wavelength converter according to claim 1, wherein the pair of reflection surfaces are respectively formed by fiber gratings.

11. A 2D image display device equipped with a wavelength converter according to claim 1, comprising a mechanism for controlling a light quantity in accordance with the luminance information of an inputted video signal.

* * * * *